US012068551B1

(12) United States Patent
Zamanzadeh et al.

(10) Patent No.: US 12,068,551 B1
(45) Date of Patent: Aug. 20, 2024

(54) CORROSION CONTROL FOR 5G EQUIPMENT

(71) Applicant: Matergenics, Inc., Pittsburgh, PA (US)

(72) Inventors: Mehrooz Zamanzadeh, Pittsburgh, PA (US); Anil Kumar Chikkam, Pittsburgh, PA (US); Aaron Ulmer, Pittsburgh, PA (US); Michael Carone, Pittsburgh, PA (US)

(73) Assignee: Matergenics, Inc., Pittsburgh, PA (US)

( * ) Notice: Subject to any disclaimer, the term of this patent is extended or adjusted under 35 U.S.C. 154(b) by 0 days.

(21) Appl. No.: 18/632,423

(22) Filed: Apr. 11, 2024

Related U.S. Application Data

(60) Provisional application No. 63/458,899, filed on Apr. 12, 2023.

(51) Int. Cl.
*H01Q 9/30* (2006.01)
*H01Q 1/24* (2006.01)
*H01Q 1/50* (2006.01)
*H01Q 1/52* (2006.01)

(52) U.S. Cl.
CPC ................. *H01Q 9/30* (2013.01); *H01Q 1/24* (2013.01); *H01Q 1/246* (2013.01); *H01Q 1/50* (2013.01); *H01Q 1/52* (2013.01); *H01Q 1/528* (2013.01)

(58) Field of Classification Search
CPC ............ H01Q 9/30; H01Q 1/246; H01Q 1/24; H01Q 1/50; H01Q 1/528; H01Q 1/52
See application file for complete search history.

(56) References Cited

U.S. PATENT DOCUMENTS 6,080,497 A * 6/2000 Carey, II ................. B32B 15/20 428/647
7,719,266 B1 * 5/2010 Zamanzadeh ...... G01R 33/1223 324/228
2002/0140623 A1 * 10/2002 Harrison .................. H01Q 9/34 343/874
2004/0233120 A1 * 11/2004 Ryan ................... E04H 12/2238 343/878
2012/0200979 A1 * 8/2012 Miller ........................ H01T 4/08 361/119
2020/0182441 A1 * 6/2020 Girouard ................. F21V 29/83
2022/0238985 A1 * 7/2022 Teresi .................... H01Q 1/246

* cited by examiner

*Primary Examiner* — Hai V Tran
(74) *Attorney, Agent, or Firm* — Bauer & Joseph

(57) ABSTRACT

A metal structure is supported by a concrete foundation with a ground ring nearby. A telecommunication module configured to operate with a 5G wireless standard is mounted on top of the metal structure and separated from the metal structure by an insulating barrier. The ground ring has at least three monopole grounding wires. A grounding cable connects the telecommunication module to the ground ring. A base transfer station cabinet is offsite from the metal structure and includes a plurality of cabinet ground conductor wires connecting to the ground ring. A hybrid cable, comprising a supply cable and a return cable, connects the base transfer station cabinet to the telecommunication module. Any stray current from the telecommunication module is directed away from the metal structure by the insulating barrier, and the stray current is directed to the ground ring through the grounding cable.

20 Claims, 5 Drawing Sheets

CORROSION CONTROL FOR 5G EQUIPMENT

CROSS REFERENCE TO RELATED APPLICATION

This application claims the benefit under 35 U.S.C. § 119(e) of Provisional Application No. 63/458,899 entitled "CORROSION CONTROL FOR 5G EQUIPMENT" filed Apr. 12, 2023 which is incorporated herein by reference.

BACKGROUND

The fifth generation mobile network to which the telecommunication industry is adapting is commonly referred to as 5G or 5G technology. While existing wireless communication infrastructures can be used to accommodate this technology, there are certain concerns that need to be addressed before the adaptation can be carried out reliably.

One concern is stray currents that can result from the installation of 5G equipment onto existing pre-5G structures, especially when such equipment is installed on metal structures. If a supply line and a return line connects a power cabinet to an antenna, ideally there would be zero currents measured on the antenna. However, that is not the case in most situations, as stray currents escape into the supporting structure of 5G antennas. These unintentional stray currents can damage equipment, such that there is a need to address such currents through a comprehensive solution. Such a solution should prevent the occurrence of stray currents in 5G connected metallic structures. The solution would be applicable for all 5G equipment connections.

SUMMARY

The following summary is provided to introduce a selection of concepts in a simplified form that are further described below in the detailed description. This summary is not intended to identify key features or essential features of the claimed subject matter, nor is it intended to be used to limit the scope of the claimed subject matter.

In various implementations, a system for controlling corrosion on a telecommunication structure comprises a metal structure supported by a concrete foundation. A telecommunication module is mounted on top of the metal structure and separated from the metal structure by an insulating barrier. The telecommunication module is configured to operate with 5G wireless standard. The system comprises a ground ring, oriented approximately around the concrete foundation and connected to the metal structure with at least three monopole grounding wires, a grounding cable connecting the telecommunication module to the ground ring, and a base transfer station cabinet, offsite from the metal structure. The base transfer station includes a plurality of cabinet ground conductor wires connecting to the ground ring. A hybrid cable, comprising a supply cable and a return cable, connects the base transfer station cabinet to the telecommunication module. The base transfer station cabinet provides supply current to the telecommunication module through the supply cable and receives return current from the telecommunication module through the return cable. Any stray current from the telecommunication module is directed away from the metal structure by the insulating barrier, and the stray current is directed to the ground ring through the grounding cable.

In various other implementations, a system for controlling corrosion on a telecommunication structure comprises a metal structure supported by a concrete foundation. A telecommunication module is mounted on top of the metal structure and configured to operate with 5G wireless standard. The system further comprises a solid state decoupler, mounted adjacent to the telecommunication module on the metal structure. A ground ring is oriented approximately around the concrete foundation and connected to the metal structure with at least three monopole grounding wires. There exists a base transfer station cabinet, offsite from the metal structure, which includes a plurality of cabinet ground conductor wires connecting to the ground ring. A hybrid cable, comprising a supply cable and a return cable, connects the base transfer station cabinet to the telecommunication module. The base transfer station cabinet provides supply current to the telecommunication module through the supply cable and receives return current from the telecommunication module through the return cable, and wherein stray current from the telecommunication module is directed away from the metal structure by solid state decoupler, which is set to be normally open.

In various other embodiments, a method for corrosion protection in a metallic telecommunication structure comprises enclosing the metallic telecommunication structure with a telecommunication module in a concrete foundation, wherein the concrete foundation separates the metallic telecommunication structure from ground; orienting a ground ring approximately around the concrete foundation; connecting the telecommunication module with a base transfer station cabinet with at least one hybrid cable comprising a supply cable and a return cable; connecting the metallic telecommunication structure to the ground ring with a plurality of monopole ground conductor wires; connecting the telecommunication module to the ground ring with a grounding cable; separating the telecommunication module from the metal structure with an insulating barrier, and connecting the ground ring with the base transfer station cabinet through a plurality of cabinet ground conductor wires. The stray current is then directed away from the metallic telecommunication structure to the ground ring through the plurality of monopole ground conductor wires.

These and other features and advantages will be apparent from a reading of the following detailed description and a review of the appended drawings. It is to be understood that the foregoing summary, the following detailed description and the appended drawings are explanatory only and are not restrictive of various aspects as claimed.

DETAILED DESCRIPTION

Figure 1:
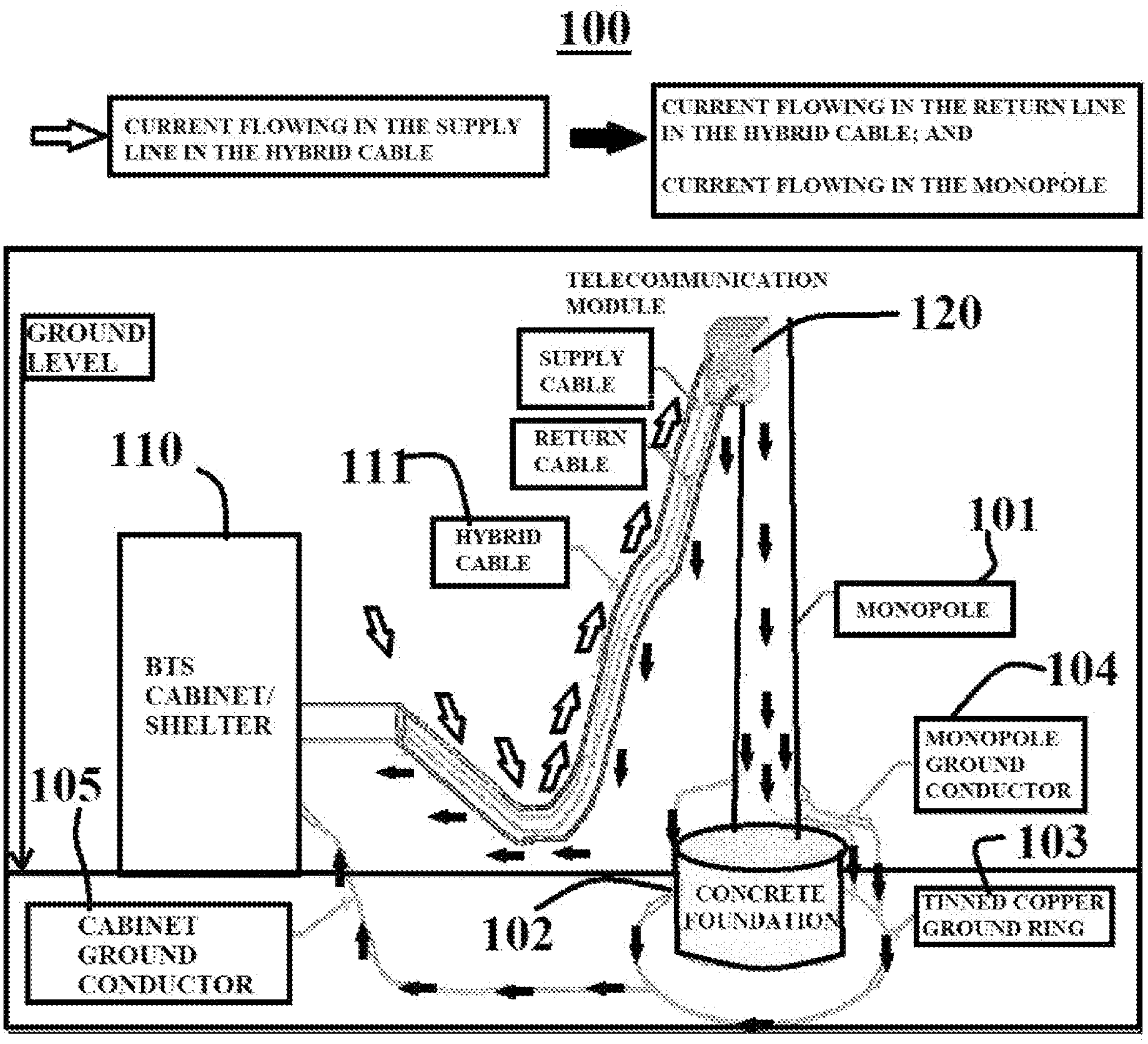
FIG. 1 is an exemplary embodiment for a system for controlling corrosion on a telecommunication structure in accordance with the subject disclosure.

The subject disclosure is directed to a system for controlling corrosion on a telecommunication system comprising a metal structure and, more particularly, to corrosion control of metallic structures exposed to unintentional stray currents passing through the metallic structure from the connected 5G equipment. The system provides a comprehensive solution for addressing the issue of unintentional stray currents from their 5G equipment on to the connected metallic structures. The solution will effectively prevent the occurrence of stray currents in the 5G connected metallic structures. 5G equipment supplier/customer could potentially apply the solution to all their 5G equipment connections.

The detailed description provided below in connection with the appended drawings is intended as a description of examples and is not intended to represent the only forms in which the present examples can be constructed or utilized. The description sets forth functions of the examples and sequences of steps for constructing and operating the examples. However, the same or equivalent functions and sequences can be accomplished by different examples.

References to "one embodiment," "an embodiment," "an example embodiment," "one implementation," "an implementation," "one example," "an example" and the like, indicate that the described embodiment, implementation or example can include a particular feature, structure or characteristic, but every embodiment, implementation or example can not necessarily include the particular feature, structure or characteristic. Moreover, such phrases are not necessarily referring to the same embodiment, implementation or example. Further, when a particular feature, structure or characteristic is described in connection with an embodiment, implementation or example, it is to be appreciated that such feature, structure or characteristic can be implemented in connection with other embodiments, implementations or examples whether or not explicitly described.

Numerous specific details are set forth in order to provide a thorough understanding of one or more embodiments of the described subject matter. It is to be appreciated, however, that such embodiments can be practiced without these specific details.

Various features of the subject disclosure are now described in more detail with reference to the drawings, wherein like numerals generally refer to like or corresponding elements throughout. The drawings and detailed description are not intended to limit the claimed subject matter to the particular form described. Rather, the intention is to cover all modifications, equivalents and alternatives falling within the spirit and scope of the claimed subject matter.

Traditional telecommunication towers with metal structures can be adapted to utilize telecommunication modules that are adapted to 5G wireless standard. However, their construction can not meet the heightened demand of the 5G capable communication module. One of the concerns is stray current generated from the 5G capable communication modules, which can escape into the metal structure. In situations where the metal structure is a monopole, there may not be appropriate safeguard to eliminate stray currents on the metal structure.

In existing solutions, particularly for those wireless communication providers that choose to utilize incumbent structures, the antenna is often attached to a monopole directly. The direct contact does not preclude stray currents from migrating onto the monopole even with a dedicated grounding subsystem. Further, incumbent structures often do not differentiate between stray current and surge current, as in the case of lightning strike. As such, incumbent structures do not provide a dedicated method for dispersing stray current in combination with a method to safeguard against lightning strikes.

Due to the nature of stray current within a 5G wireless communication system, it is ideal to have at least three conductors connecting the monopole to the tinned ground ring surrounding the structure. However, this is not a requirement or preferred configuration to previous generation of wireless communication protocol, as the stray current of the previous generations are less pervasive and damaging. As such, many of the incumbent structures do not have the sufficient conductor to ground ring setup that is necessary to adapt to 5G applications.

Many of the incumbent structures are erected directly from the ground. Any foundation structure tends to be constructed for stability purposes, thus lacking design foresight for stray current insulation. As such, part of these incumbent structures would be in direct contact with the surrounding soil. If a structure base is buried in the soil, the current will discharge from the structure to the soil instead of flowing through the grounding conductors. This will result in accelerated corrosion of the structure at the current discharge areas.

Therefore, the equipment for 5G wireless communication needs to be modified or constructed anew with consideration for increased stray current. Compared to the previous generation of wireless communication protocol, where stray current rarely exceed 0.1 mA, the 5G wireless communication modules can produce stray current that exceed 100 mA. Due to such increase, safety hazard and corrosion risk have skyrocketed. Thus, a dedicated corrosion prevention system is needed for the 5G wireless communication system. It is foreseeable that stray current would continue to increase as the wireless communication technology advances, and it is envisioned that the corrosion control system disclosed herein can be modified to accommodate the increasing demand in the future.

The corrosion control of metallic structures exposed to unintentional stray currents passing through the metallic structure from the connected 5G equipment include a number of features: separate grounding cables must be run from the 5G equipment to the ground ring; applying a coating at the top of the structures to isolate the 5G equipment from the structures; ensuring that the structures must have concrete foundations and are not directly buried.

The subject disclosure also provides a method for corrosion control in the aforementioned scenario, consisting separating grounding connections between the 5G equipment to a ground ring and properly isolating the metal structure and the ground ring. It is foreseeable that new telecommunication structures can be constructed according to the method and system disclosed herein. Further, existing telecommunication structures can be modified in accordance to the disclosure to adapt to the 5G equipment installation/retrofit objectives.

Now referring to the drawings and particularly to FIG. 1, various features of the subject disclosure are now described in more detail with respect to a system for controlling corrosion on a telecommunication structure. The system is generally designated as 100 and can be implemented as either a new set up or a retrofit modification on existing infrastructure. The system 100 comprises a metal structure 101, in the exemplary embodiment shown as a monopole. The metal structure 101 can be any of the state-of-the-art support structure that can be used in supporting relevant telecommunication devices. For exemplary purposes, a monopole is shown in the illustration. The monopole metal structure 101 is enclosed by a concrete foundation 102. The concrete foundation 102 ensures that the metal structure 101 is not directly paced within the ground. The concrete foundation 102 provides support for the metal structure 101 while enabling a level of insulation against stray currents, in addition to the other relevant components of the system 100.

On top of the monopole metal structure 101, a radio antenna or telecommunication module 120 is installed. The telecommunication module 120 is configured to operate with 5G wireless communication standard. The telecommunication module 120 can be placed on a specifically allocated metal structure 101 or retrofitted onto existing metal structures currently used for previous generation wireless protocols. In an exemplary embodiment, a coating is placed on the metal structure 101 to isolate the telecommunication module 120 further.

Somewhere offsite, a base transfer station cabinet/shelter 110 is placed. The base transfer station cabinet 110 would be similar to any of the base transfer station cabinets traditionally associated with wireless telecommunication towers. The base transfer station cabinet 110 is connected to the telecommunication module 120 on the metal structure 101 through at least one hybrid cable 111. The hybrid cable 111 can comprise a plurality of supply cables and return cables. The hybrid cable 111 enables typical function that would be expected to carry out between the base transfer station cabinet and radio/antennas. In various embodiments, supply current flows from the base transfer station cabinet 110 to the telecommunication module 120 via the supply cable. In turn, return currents flow back from the telecommunication module 120 to the base transfer station 110 via the return cable. In various embodiments, current that is stray can flow through the monopole metal structure 101. The current system is intended to prevent corrosion resulting from such stray current within the monopole metal structure.

Approximately around the concrete foundation 102, a ground ring 103 is oriented some distance away from its perimeter. In this exemplary embodiment, the ground ring 103 comprises tinned copper. In various other embodiments, alternative material suitable for grounding purposes can be used for the ground ring 103.

The ground ring 103 is connected to the base transfer station cabinet 110 and the monopole metal structure 101. A cabinet ground conductor 105 is used to connect the ground ring 103 to the base transfer station cabinet. A monopole ground conductor cable 104 is used to connect the ground ring 103 to the monopole metal structure 101. The monopole ground conductor cable 104 directs any stray current present on the monopole metal structure 101 to flow to the tinned copper ground ring 103. Subsequently, the stray current flows back to the base transfer station cabinet 110 through the cabinet ground conductor cable 105. The stray current is then disposed of, such that it would not be residing within the monopole to enable corrosion formation.

Figure 2:
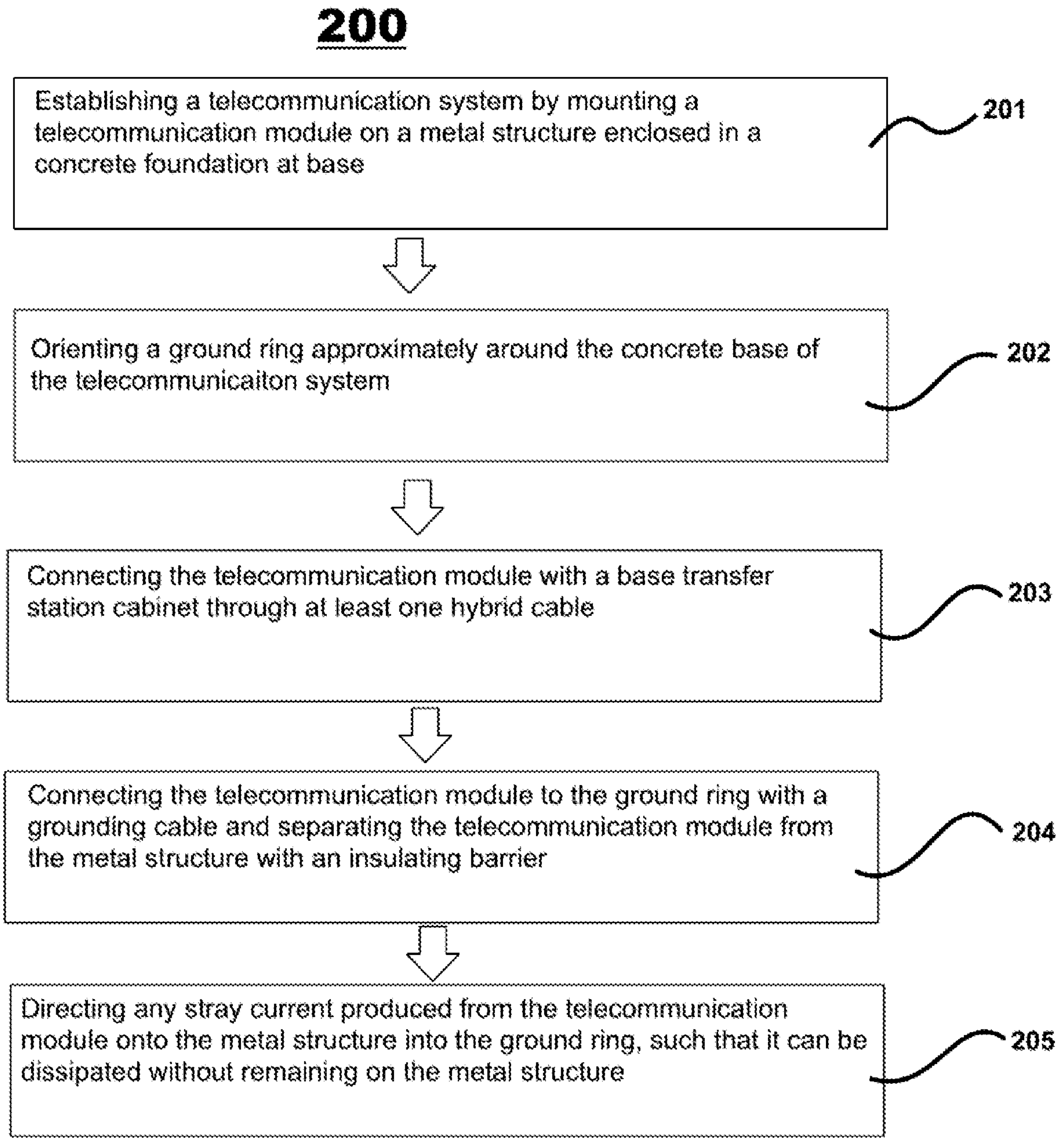
FIG. 2 is an exemplary process in accordance with the subject disclosure.

Referring to FIG. 2, an exemplary process for utilizing the system for controlling corrosion on a telecommunication structure is generally designated as 200. At 201, a telecommunication system is established by mounting a telecommunication module on a metal structure enclosed in a concrete foundation at its base. The telecommunication system can be the radio/antenna/telecommunication module 102 mounted on top of the metal structure 101 as shown in FIG. 1.

At 202, a ground ring is oriented approximately around the concrete base of the telecommunication system. The ground ring can be the tinned copper ground ring 103 as shown in FIG. 1, approximately around the concrete base 102.

At 203, the telecommunication module is connected with a base transfer station cabinet through at least one hybrid cable.

At 204, the ground ring is connected with the telecommunication module through a grounding cable. Further, the telecommunication module is separated from the metal structure through an insulating barrier.

At 205, any stray current produced by the telecommunication module that can reside within the monopole metal structure is directed away from the metal structure into the ground ring, such that it can be dissipated through the base transfer station cabinet. Thus stray currents will not reside within the monopole metal structure to affect corrosion material formation theocon.

Figure 3:
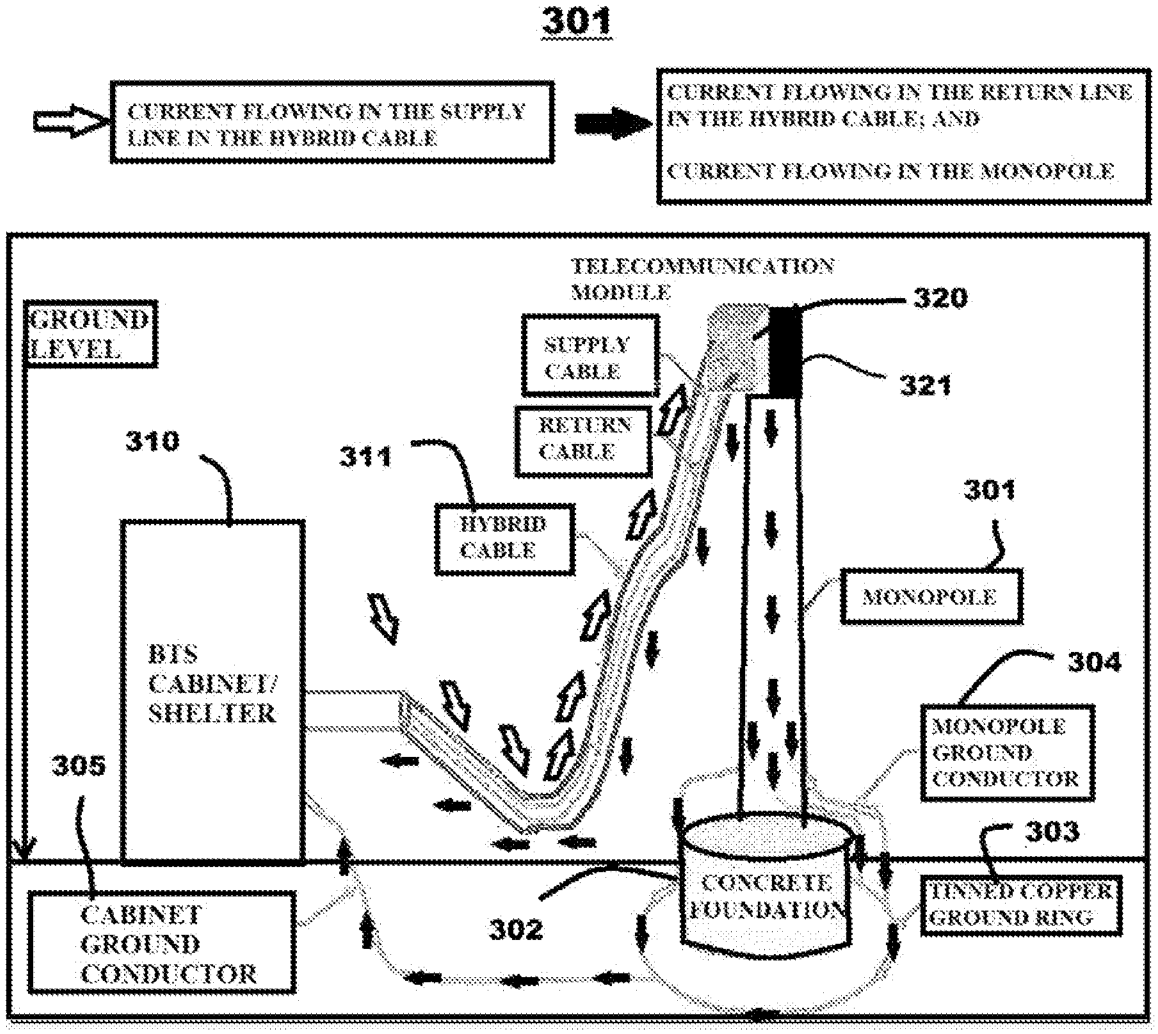
FIG. 3 is an exemplary embodiment for a system for controlling corrosion on a telecommunication structure in accordance with the subject disclosure with an insulating barrier.

Now referring to FIG. 3, another embodiment of the system for controlling corrosion on a telecommunication structure is generally designated as 300. The system 300 comprises a metal structure 301, shown as a monopole in the exemplary embodiment. The metal structure 301 can be any of the state-of-the-art support structure that can be used in supporting relevant telecommunication devices. The monopole metal structure 301 is enclosed by a concrete foundation 302. The concrete foundation 302 ensures that the metal structure 301 is not directly paced within the ground. The concrete foundation 302 provides support for the metal structure 301 while enabling a level of insulation against stray currents, in addition to the other relevant components of the system 300. The concrete foundation 302 provides an appropriate degree of separation from soil in the surrounding areas, which can provide a pathway for stray current. Stray current escaping into the soil would generate corrosive effect on the metal structure 301 without proper grounding.

On top of the monopole metal structure 301, a radio antenna or telecommunication module 320 is installed. The telecommunication module 320 is configured to operate with 5G wireless communication standard. The telecommunication module 320 can be placed on a specifically allocated metal structure 301 or retrofitted onto existing metal structures currently used for previous generation wireless protocols. In an exemplary embodiment, an insulating barrier 321 is placed on the metal structure 301 to isolate the telecommunication module 320 further, such that stray currents will be directed onto a grounding mechanism instead of the metal structure 301. In an exemplary embodiment, the barrier 321 is an insulating coating. It is envisioned that a person with ordinary skills in the art would select a coating material that would provide sufficient insulation, and that such coating 301 can be applied to existing metal structures during retrofit in order to accommodate the 5G specific telecommunication module 320.

Somewhere offsite, a base transfer station cabinet/shelter 310 is placed. The base transfer station cabinet 310 would be similar to any of the base transfer station cabinets traditionally associated with wireless telecommunication towers. The base transfer station cabinet 310 is connected to the telecommunication module 320 on the metal structure 301 through at least one hybrid cable 311. The hybrid cable 311 can comprise a plurality of supply cables and return cables. The hybrid cable 311 enables typical function that would be expected to carry out between the base transfer station cabinet and radio/antennas. A power generator would be placed within the base transfer station cabinet 310, and supply current can be transmitted to the telecommunication module 320 through the hybrid cable 311.

In various embodiments, supply current flows from the base transfer station cabinet 310 to the telecommunication module 320 via the supply cable. In turn, return currents flow back from the telecommunication module 320 to the base transfer station 310 via the return cable.

Additionally, a ground ring 303 is oriented some distance away from perimeter of the concrete foundation 302. In this exemplary embodiment, the ground ring 303 comprises tinned copper. In various other embodiments, alternative material suitable for grounding purposes can be used for the ground ring 303. The area covered by the insulated coating 321 should be sufficient to isolate the metal structure 301 from stray current sourced from the telecommunication module 320 and any connected components.

The ground ring 303 is connected to the base transfer station cabinet 310 and the monopole metal structure 301. A cabinet ground conductor 305 is used to connect the ground ring 303 to the base transfer station cabinet. A monopole ground conductor cable 304 is used to connect the ground ring 303 to the monopole metal structure 301.

The insulated coating 321 is used to avoid contact between the telecommunication module 320 and the structure 301. The insulated coating 321 thus isolates the telecommunication module 320, such that any stray current from therein will be directed to the return cable within the hybrid cable 311. The metal structure 301 thus does not experience metal loss from corrosion caused by any stray current traveling onto its surface.

In existing structures, ground conductor cable 304 may not be sufficient, both in quantity and in quality. Ideally, three ground conduct cables 304 would be used to connect the metal structure 301 to the ground ring 303. In practice, the number of ground conductor cables could be fewer, and the ground conductor cables could have eroded. As such, the stray currents would not be directed to the grounding cables, but rather reside within the metal structure 301. In addition to a safety factor, the increasing stray current on the metal structure 301 would lead to degradation of its surface and result in corrosion.

The monopole ground conductor cable 304 combined with the insulating coating 321 would direct any stray current present on the monopole metal structure 301 to flow to the tinned copper ground ring 303. This ensures that stray current both has an outlet through the ground conductor cable 304 and a barrier through the insulating coating 321. Subsequently, the stray current flows back to the base transfer station cabinet 310 through the cabinet ground conductor cable 305. The stray current is then disposed of, such that it would not be residing within the monopole to enable corrosion formation.

Figure 4:
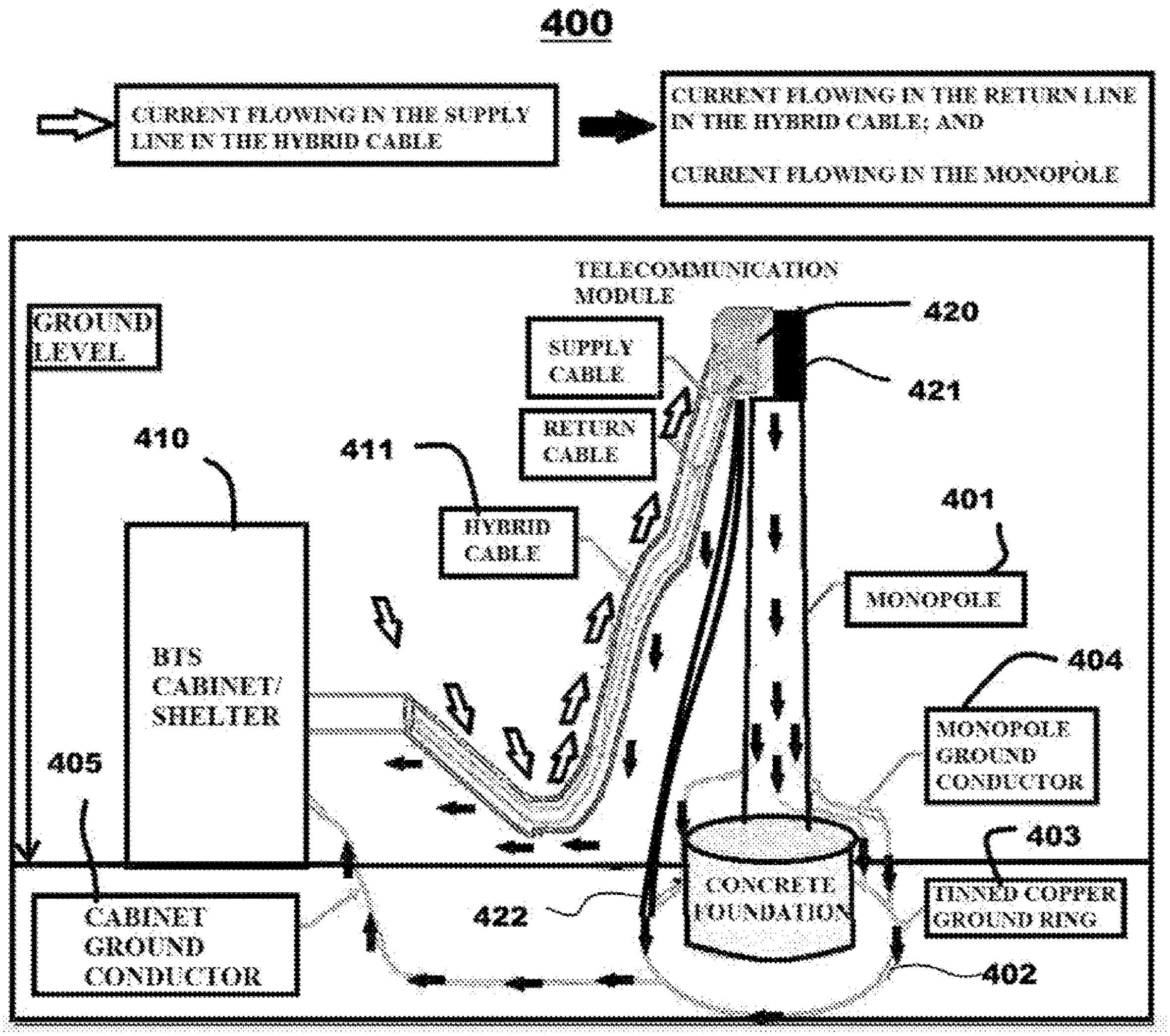
FIG. 4 is an exemplary embodiment for a system for controlling corrosion on a telecommunication structure in accordance with the subject disclosure with a separate grounding cable.

Now referring to FIG. 4, another embodiment of the system for controlling corrosion on a telecommunication structure is generally designated as 400. The system 400 comprises a metal structure 401, shown as a monopole in the exemplary embodiment. The metal structure 401 can be any of the state-of-the-art support structure that can be used in supporting relevant telecommunication devices. The monopole metal structure 401 is enclosed by a concrete foundation 402. The concrete foundation 402 ensures that the metal structure 401 is not directly paced within the ground. The concrete foundation 402 provides support for the metal structure 401 while enabling a level of insulation against stray currents, in addition to the other relevant components of the system 400. The concrete foundation 402 provides an appropriate degree of separation from soil in the surrounding areas, which can provide a pathway for stray current. Stray current escaping into the soil would generate corrosive effect on the metal structure 401 without proper grounding.

On top of the monopole metal structure 401, a radio antenna or telecommunication module 420 is installed. The telecommunication module 420 is configured to operate with 5G wireless communication standard. The telecommunication module 420 can be placed on a specifically allocated metal structure 401 or retrofitted onto existing metal structures currently used for previous generation wireless protocols. In an exemplary embodiment, an insulating barrier 421 is placed on the metal structure 401 to isolate the telecommunication module 420 further, such that stray currents will be directed onto a grounding mechanism instead of the metal structure 401. In this exemplary embodiment, the barrier 421 is an insulating coating. It is envisioned that a person with ordinary skills in the art would select a coating material that would provide sufficient insulation, and that such coating 401 can be applied to existing metal structures during retrofit in order to accommodate the 5G specific telecommunication module 420.

Somewhere offsite, a base transfer station cabinet/shelter 410 is placed. The base transfer station cabinet 410 would be similar to any of the base transfer station cabinets traditionally associated with wireless telecommunication towers. The base transfer station cabinet 410 is connected to the telecommunication module 420 on the metal structure 401 through at least one hybrid cable 411. The hybrid cable 411 can comprise a plurality of supply cables and return cables. The hybrid cable 411 enables typical function that would be expected to carry out between the base transfer station cabinet and radio/antennas. A power generator would be placed within the base transfer station cabinet 410, and supply current can be transmitted to the telecommunication module 420 through the hybrid cable 411.

In various embodiments, supply current flows from the base transfer station cabinet 410 to the telecommunication module 420 via the supply cable. In turn, return currents flow back from the telecommunication module 420 to the base transfer station 410 via the return cable.

Additionally, a ground ring 403 is oriented some distance away from perimeter of the concrete foundation 302. In this exemplary embodiment, the ground ring 403 comprises tinned copper. In various other embodiments, alternative material suitable for grounding purposes can be used for the ground ring 403. The area covered by the insulated coating 421 should be sufficient to isolate the metal structure 401 from stray current sourced from the telecommunication module 420 and any connected components.

The ground ring 403 is connected to the base transfer station cabinet 410 and the monopole metal structure 401. A cabinet ground conductor 405 is used to connect the ground ring 403 to the base transfer station cabinet. A monopole ground conductor cable 404 is used to connect the ground ring 403 to the monopole metal structure 401.

In the exemplary embodiment, a separate grounding cable 422 connects the tinned copper ground ring 403 with the telecommunication module 420. The separate ground cable 422 provides an additional safeguard combined with the insulated coating 421. By having a dedicated grounding cable, another channel opens for stray current to travel instead of through the monopole metal structure 401. The separate grounding cable 422 ensures that any residual return current will only through the separate grounding cable 422 to the tinned copper ground ring 403 and base transfer station cabinet 410. Further, the separate grounding cable 422 provides an additional safeguard for when the ground conductors 404 degrade and fail. In the event that this corrosion control system 400 is implemented on an existing structure, installing a separate grounding cable 422 allows users to uphold corrosion protection regardless of the condition of existing ground conductors.

The insulated coating 421 isolates the telecommunication module 420, such that any stray current from therein will be directed away from the metal structure 401. In the exemplary embodiment, the insulated coating 421 and the grounding cable 422 provides both a barrier and an outlet for stray currents, thus further ensuring that the metal structure 401 thus does not experience metal loss from corrosion caused by any stray current traveling onto its surface.

The separate grounding cable 422 combined with the insulating coating 421 would direct any stray current present on the monopole metal structure 401 to flow to the tinned copper ground ring 403. This ensures that stray current both has an outlet through the separate grounding cable 422 and a barrier through the insulating coating 421. Subsequently, the stray current flows back to the base transfer station cabinet 410 through the cabinet ground conductor cable 405. The stray current is then disposed of, such that it would not be residing within the monopole to enable corrosion formation.

Figure 5:
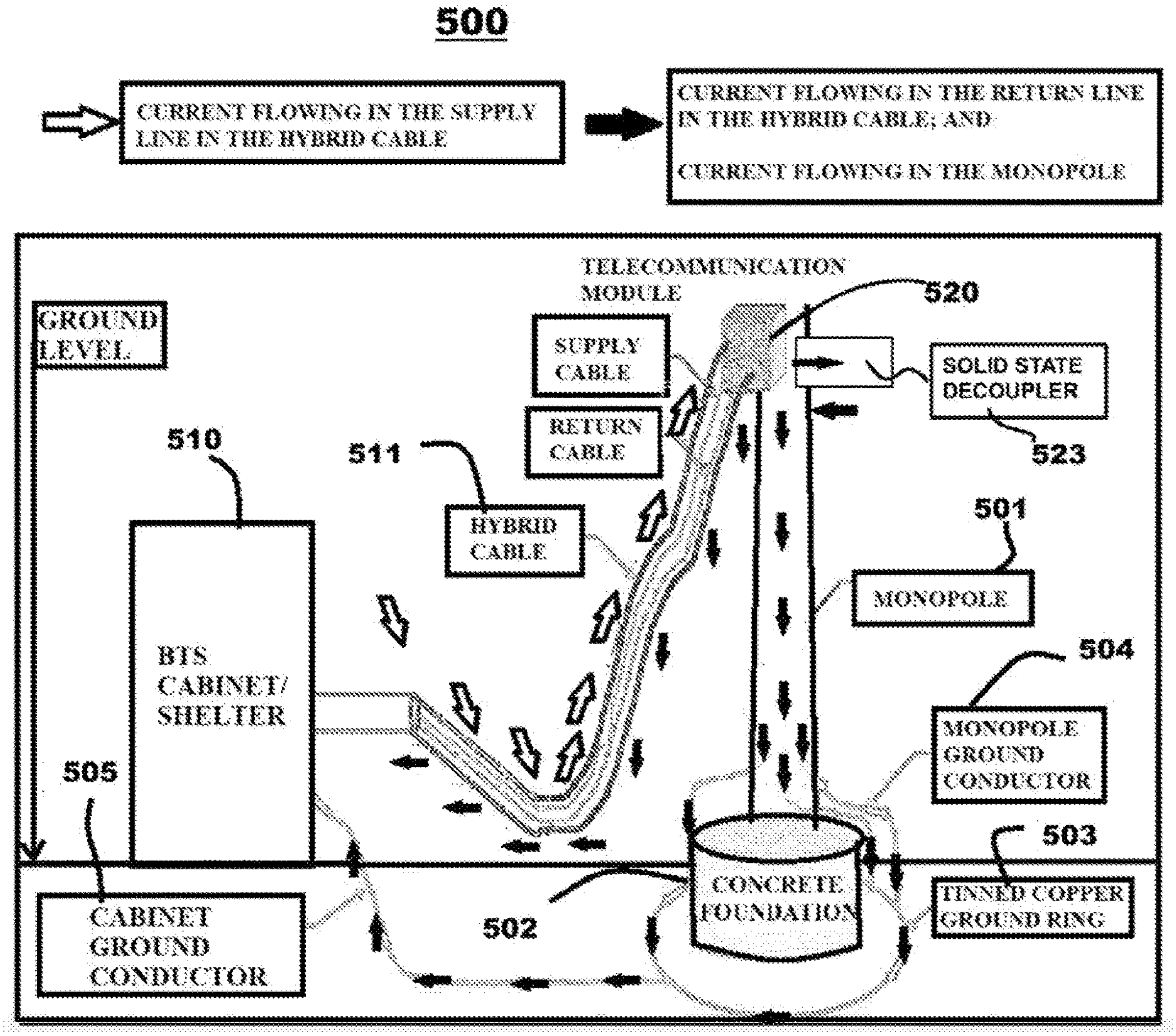
FIG. 5 is an exemplary embodiment for a system for controlling corrosion on a telecommunication structure in accordance with the subject disclosure with a solid state decoupler.

Now referring to FIG. 5, another embodiment of the system for controlling corrosion on a telecommunication structure is generally designated as 500. The system 500 comprises a metal structure 501, shown as a monopole in the exemplary embodiment. The metal structure 501 can be any of the state-of-the-art support structure that can be used in supporting relevant telecommunication devices. The monopole metal structure 501 is enclosed by a concrete foundation 502. The concrete foundation 502 ensures that the metal structure 501 is not directly paced within the ground. The concrete foundation 502 provides support for the metal structure 501 while enabling a level of insulation against stray currents, in addition to the other relevant components of the system 500. The concrete foundation 502 provides an appropriate degree of separation from soil in the surrounding areas, which can provide a pathway for stray current. Stray current escaping into the soil would generate corrosive effect on the metal structure 501 without proper grounding.

On top of the monopole metal structure 501, a radio antenna or telecommunication module 520 is installed. The telecommunication module 520 is configured to operate with 5G wireless communication standard. The telecommunication module 520 can be placed on a specifically allocated metal structure 401 or retrofitted onto existing metal structures currently used for previous generation wireless protocols. In an exemplary embodiment, a coating 521 is placed on the metal structure 501 to isolate the telecommunication module 520 further, such that stray currents will be directed onto a grounding mechanism instead of the metal structure 501. It is envisioned that a person with ordinary skills in the art would select a coating material that would provide sufficient insulation, and that such coating 501 can be applied to existing metal structures during retrofit in order to accommodate the 5G specific telecommunication module 520.

Somewhere offsite, a base transfer station cabinet/shelter 510 is placed. The base transfer station cabinet 510 would be similar to any of the base transfer station cabinets traditionally associated with wireless telecommunication towers. The base transfer station cabinet 510 is connected to the telecommunication module 520 on the metal structure 501 through at least one hybrid cable 511. The hybrid cable 511 can comprise a plurality of supply cables and return cables. The hybrid cable 511 enables typical function that would be expected to carry out between the base transfer station cabinet and radio/antennas. A power generator would be placed within the base transfer station cabinet 510, and supply current can be transmitted to the telecommunication module 520 through the hybrid cable 511.

In various embodiments, supply current flows from the base transfer station cabinet 510 to the telecommunication module 520 via the supply cable. In turn, return currents flow back from the telecommunication module 520 to the base transfer station 510 via the return cable.

Additionally, a ground ring 503 is oriented some distance away from perimeter of the concrete foundation 502. In this exemplary embodiment, the ground ring 503 comprises tinned copper. In various other embodiments, alternative material suitable for grounding purposes can be used for the ground ring 503. The area covered by the insulated coating 521 should be sufficient to isolate the metal structure 501 from stray current sourced from the telecommunication module 520 and any connected components.

The ground ring 503 is connected to the base transfer station cabinet 510 and the monopole metal structure 501. A cabinet ground conductor 505 is used to connect the ground ring 503 to the base transfer station cabinet. A monopole ground conductor cable 504 is used to connect the ground ring 503 to the monopole metal structure 501.

In the exemplary embodiment, a solid state decoupler 523 is installed on the metal structure 501 in relation to the telecommunication module 520. The solid state decoupler 523 provides means to shield the metal structure 501 from any stray current originating from the telecommunication module 520, but offers safeguard during emergency electric surge conditions. For example, when the antenna or the telecommunication module 520 is struck by lightning, the solid state decoupler 523 switches and allows the excess charge flowing onto the metal structure 501. As such, the stray current would be directed away from the metal structure 501 until an emergency that would threaten the telecommunication module occurs.

In various embodiments, the solid state decoupler 523 is set to be open, such that there is no electrical current going between the antenna of the telecommunication module 520 and the metal structure 501. During overvoltage conditions, the solid state decoupler 523 would switch to closed condition and allow the overvoltage to pass through to the metal structure 501 temporarily. Such short exposure would not impart significant corrosion risk onto the metal structure 501, but still provides safety measures for the emergency situations.

It is foreseeable that the solid state decoupler 523 can be used in connection with the embodiments illustrated in the preceding figures. For example, the solid state decoupler 523 can be combined with an insulating coating to further provide barrier from stray current. In another example, a separate grounding cable would be connecting the solid state decoupler 523 with a grounding ring, such that during overvoltage conditions, the excess currents would still be directed away from the metal structure.

Supported Features and Embodiments

The detailed description provided above in connection with the appended drawings explicitly describes and supports various features of a corrosion control system for metallic structures exposed to unintentional stray currents passing through the metallic structure from connected 5G equipment. By way of illustration and not limitation, supported embodiments include a system for controlling corrosion on a telecommunication structure. The system for controlling corrosion on a telecommunication structure comprises a metal structure supported by a concrete foundation. A telecommunication module is mounted on top of the metal structure and separated from the metal structure by an insulating barrier. The telecommunication module is configured to operate with 5G wireless standard. The system comprises a ground ring, oriented approximately around the concrete foundation and connected to the metal structure with at least three monopole grounding wires, a grounding cable connecting the telecommunication module to the ground ring, and a base transfer station cabinet, offsite from the metal structure. The base transfer station includes a plurality of cabinet ground conductor wires connecting to the ground ring. A hybrid cable, comprising a supply cable and a return cable, connects the base transfer station cabinet to the telecommunication module. The base transfer station cabinet provides supply current to the telecommunication module through the supply cable and receives return current from the telecommunication module through the return cable. Any stray current from the telecommunication module is directed away from the metal structure by the insulating barrier, and the stray current is directed to the ground ring through the grounding cable.

Supported embodiments include the foregoing system for controlling corrosion on a telecommunication structure, wherein the insulating barrier is an insulating coating.

Supported embodiments include any of the foregoing systems for controlling corrosion on a telecommunication structure, wherein the metal structure is enclosed in the concrete foundation, such that the metal structure is not in direct contact with the ground.

Supported embodiments include any of the foregoing systems for controlling corrosion on a telecommunication structure, wherein the ground ring comprises tinned copper.

Supported embodiments include any of the foregoing systems for controlling corrosion on a telecommunication structure, wherein the metal structure is a monopole.

Supported embodiments include any of the foregoing systems for controlling corrosion on a telecommunication structure, wherein the insulating barrier is a physical barrier that the telecommunication module is mounted upon.

Supported embodiments include any of the foregoing systems for controlling corrosion on a telecommunication structure, wherein the monopole grounding wires are substantially above ground level, such that stray current does not affect the metal structure.

Supported embodiments include a system for controlling corrosion on a telecommunication structure. The system comprises a metal structure supported by a concrete foundation. A telecommunication module is mounted on top of the metal structure and configured to operate with 5G wireless standard. The system further comprises a solid state decoupler, mounted adjacent to the telecommunication module on the metal structure. A ground ring is oriented approximately around the concrete foundation and connected to the metal structure with at least three monopole grounding wires. There exists a base transfer station cabinet, offsite from the metal structure, which includes a plurality of cabinet ground conductor wires connecting to the ground ring. A hybrid cable, comprising a supply cable and a return cable, connects the base transfer station cabinet to the telecommunication module. The base transfer station cabinet provides supply current to the telecommunication module through the supply cable and receives return current from the telecommunication module through the return cable, and wherein stray current from the telecommunication module is directed away from the metal structure by solid state decoupler, which is set to be normally open.

Supported embodiments include the foregoing system for controlling corrosion on a telecommunication structure, wherein the solid state structure is set to close at an overvoltage event, wherein overvoltage current is directed to the ground ring through the metal structure.

Supported embodiments include any of the foregoing systems for controlling corrosion on a telecommunication structure, wherein the metal structure is enclosed in the concrete foundation, such that the metal structure is not in direct contact with the ground.

Supported embodiments include any of the foregoing systems for controlling corrosion on a telecommunication structure, wherein the ground ring comprises tinned copper.

Supported embodiments include any of the foregoing systems for controlling corrosion on a telecommunication structure, wherein the metal structure is a monopole.

Supported embodiments include any of the foregoing systems for controlling corrosion on a telecommunication structure, further comprising an insulating barrier between the telecommunication module and the metal structure.

Supported embodiments include any of the foregoing systems for controlling corrosion on a telecommunication structure, wherein the insulating barrier is an insulating coating.

Supported embodiments include any of the foregoing systems for controlling corrosion on a telecommunication structure, further comprising a grounding cable connecting the solid state decoupler with the grounding ring.

Supported embodiments include any of the foregoing systems for controlling corrosion on a telecommunication structure, where in the monopole grounding wires are substantially above ground level, such that stray current does not affect the metal structure.

Supported embodiments include a method for corrosion protection in a metallic telecommunication structure. The method comprises enclosing the metallic telecommunication structure with a telecommunication module in a concrete foundation, wherein the concrete foundation separates the metallic telecommunication structure from ground; orienting a ground ring approximately around the concrete foundation; connecting the telecommunication module with a base transfer station cabinet with at least one hybrid cable comprising a supply cable and a return cable; connecting the metallic telecommunication structure to the ground ring with a plurality of monopole ground conductor wires; connecting the telecommunication module to the ground ring with a grounding cable; separating the telecommunication module from the metal structure with an insulating barrier, and connecting the ground ring with the base transfer station cabinet through a plurality of cabinet ground conductor wires. The stray current is then directed away from the metallic telecommunication structure to the ground ring through the plurality of monopole ground conductor wires.

Supported embodiments include the foregoing method for corrosion protection in a metallic telecommunication structure, further comprising providing a solid-state decoupler on the metal structure.

Supported embodiments include any of the foregoing methods for corrosion protection in a metallic telecommunication structure, further comprising setting the solid-state decoupler to normally open and setting the solid state decoupler to closed during overvoltage events.

Supported embodiments include any of the foregoing methods for corrosion protection in a metallic telecommunication structure wherein the insulating barrier is an insulating coating.

Supported embodiments include an apparatus, a device, and/or means for implementing any of the foregoing systems, methods, or portions thereof.

The detailed description provided above in connection with the appended drawings is intended as a description of examples and is not intended to represent the only forms in which the present examples can be constructed or utilized.

It is to be understood that the configurations and/or approaches described herein are exemplary in nature, and that the described embodiments, implementations and/or examples are not to be considered in a limiting sense, because numerous variations are possible.

The specific processes or methods described herein can represent one or more of any number of processing strategies. As such, various operations illustrated and/or described can be performed in the sequence illustrated and/or described, in other sequences, in parallel, or omitted. Likewise, the order of the above-described processes can be changed.

Although the subject matter has been described in language specific to structural features and/or methodological acts, it is to be understood that the subject matter defined in the appended claims is not necessarily limited to the specific features or acts described above. Rather, the specific features and acts described above are presented as example forms of implementing the claims.

What is claimed is:

1. A system for controlling corrosion on a telecommunication structure, comprising:
- a metal structure supported by a concrete foundation,
- a telecommunication module, mounted on top of the metal structure and separated from the metal structure by an insulating barrier, configured to operate with 5G wireless standard,
- a ground ring, oriented approximately around the concrete foundation and connected to the metal structure with at least three monopole grounding wires,
- a grounding cable connecting the telecommunication module to the ground ring,
- a base transfer station cabinet, offsite from the metal structure, including a plurality of cabinet ground conductor wires connecting to the ground ring, and
- a hybrid cable, comprising a supply cable and a return cable, connects the base transfer station cabinet to the telecommunication module,
- wherein the base transfer station cabinet provides supply current to the telecommunication module through the supply cable and receives return current from the telecommunication module through the return cable, and
- wherein stray current from the telecommunication module is directed away from the metal structure by the insulating barrier, and the stray current is directed to the ground ring through the grounding cable.

2. The system of claim 1, wherein the insulating barrier is an insulating coating.

3. The system of claim 1, wherein the metal structure is enclosed in the concrete foundation, such that the metal structure is not in direct contact with the ground.

4. The system of claim 1, wherein the ground ring comprises tinned copper.

5. The system of claim 1, wherein the metal structure is a monopole.

6. The system of claim 1, wherein the insulating barrier is a physical barrier that the telecommunication module is mounted upon.

7. The system of claim 1, wherein the monopole grounding wires are substantially above ground level, such that stray current does not affect the metal structure.

8. A system for controlling corrosion on a telecommunication structure, comprising:
- a metal structure supported by a concrete foundation,
- a telecommunication module, mounted on top of the metal structure, configured to operate with 5G wireless standard,
- a solid state decoupler, mounted adjacent to the telecommunication module on the metal structure,
- a ground ring, oriented approximately around the concrete foundation and connected to the metal structure with at least three monopole grounding wires,
- a base transfer station cabinet, offsite from the metal structure, including a plurality of cabinet ground conductor wires connecting to the ground ring, and
- a hybrid cable, comprising a supply cable and a return cable, connects the base transfer station cabinet to the telecommunication module,
- wherein the base transfer station cabinet provides supply current to the telecommunication module through the supply cable and receives return current from the telecommunication module through the return cable, and
- wherein stray current from the telecommunication module is directed away from the metal structure by the solid state decoupler, which is set to be normally open.

9. The system of claim 8, wherein the solid state structure is set to close at an overvoltage event, wherein overvoltage current is directed to the ground ring through the metal structure.

10. The system of claim 8, wherein the metal structure is enclosed in the concrete foundation, such that the metal structure is not in direct contact with the ground.

11. The system of claim 8, wherein the ground ring comprises tinned copper.

12. The system of claim 8, wherein the metal structure is a monopole.

13. The system of claim 8, further comprising an insulating barrier between the telecommunication module and the metal structure.

14. The system of claim 13, wherein the insulating barrier is an insulating coating.

15. The system of claim 8, further comprising a grounding cable connecting the solid state decoupler with the grounding ring.

16. The system of claim 8, where in the monopole grounding wires are substantially above ground level, such that stray current does not affect the metal structure.

17. A method for corrosion protection in a metallic telecommunication structure, comprising:
- enclosing the metallic telecommunication structure with a telecommunication module in a concrete foundation, wherein the concrete foundation separates the metallic telecommunication structure from ground,
- orienting a ground ring approximately around the concrete foundation,
- connecting the telecommunication module with a base transfer station cabinet with at least one hybrid cable comprising a supply cable and a return cable,
- connecting the metallic telecommunication structure to the ground ring with a plurality of monopole ground conductor wires, connecting the telecommunication module to the ground ring with a grounding cable, separating the telecommunication module from the metal structure with an insulating barrier, and connecting the ground ring with the base transfer station cabinet through a plurality of cabinet ground conductor wires, and directing stray current from the metallic telecommunication structure to the ground ring through the plurality of monopole ground conductor wires.

18. The method of claim 17, further comprising providing a solid state decoupler on the metal structure.

19. The method of claim 18, further comprising setting the solid state decoupler to normally open and setting the solid state decoupler to closed during overvoltage events.

20. The method of claim 17, wherein the insulating barrier is an insulating coating.

* * * * *